United States Patent [19]

Talabisco et al.

[11] Patent Number: 5,357,741

[45] Date of Patent: Oct. 25, 1994

[54] NO$_x$ AND CO CONTROL FOR GAS TURBINE

[75] Inventors: George C. Talabisco; Gregory P. Holland, both of Olean, N.Y.

[73] Assignee: Dresser-Rand Company, Corning, N.Y.

[21] Appl. No.: 877,667

[22] Filed: May 1, 1992

[51] Int. Cl.$^5$ .............................. F02C 3/30
[52] U.S. Cl. .................... 60/39.05; 60/39.3; 60/39.55
[58] Field of Search .......... 60/39.05, 39.3, 39.53, 60/39.55, 39.58, 39.59

[56] References Cited

U.S. PATENT DOCUMENTS

| | | | |
|---|---|---|---|
| 3,693,347 | 9/1972 | Kydd et al. | 60/39.3 |
| 4,160,362 | 7/1979 | Martens et al. | 60/39.3 |
| 4,259,837 | 4/1981 | Russell et al. | 60/39.55 |
| 4,667,465 | 5/1987 | Munk | 60/39.3 |
| 4,733,527 | 3/1988 | Kidd | 60/39.3 |
| 4,928,478 | 5/1990 | Maslak | 60/39.3 |

FOREIGN PATENT DOCUMENTS 173323  9/1985  Japan .................... 60/39.3

Primary Examiner—Louis J. Casaregola
Attorney, Agent, or Firm—Jones, Day, Reavis & Pogue

[57] ABSTRACT

Method and apparatus for maintaining a substantially constant level of NO$_x$ and minimizing CO emissions from a gas turbine. The emission levels are maintained by injecting a calculated amount of steam into the combustion section of the gas turbine. The amount of steam injected is varied based on fuel flow, inlet air temperature, relative humidity, fuel heating value and turbine load which is a function of the turbine firing temperature.

26 Claims, 6 Drawing Sheets

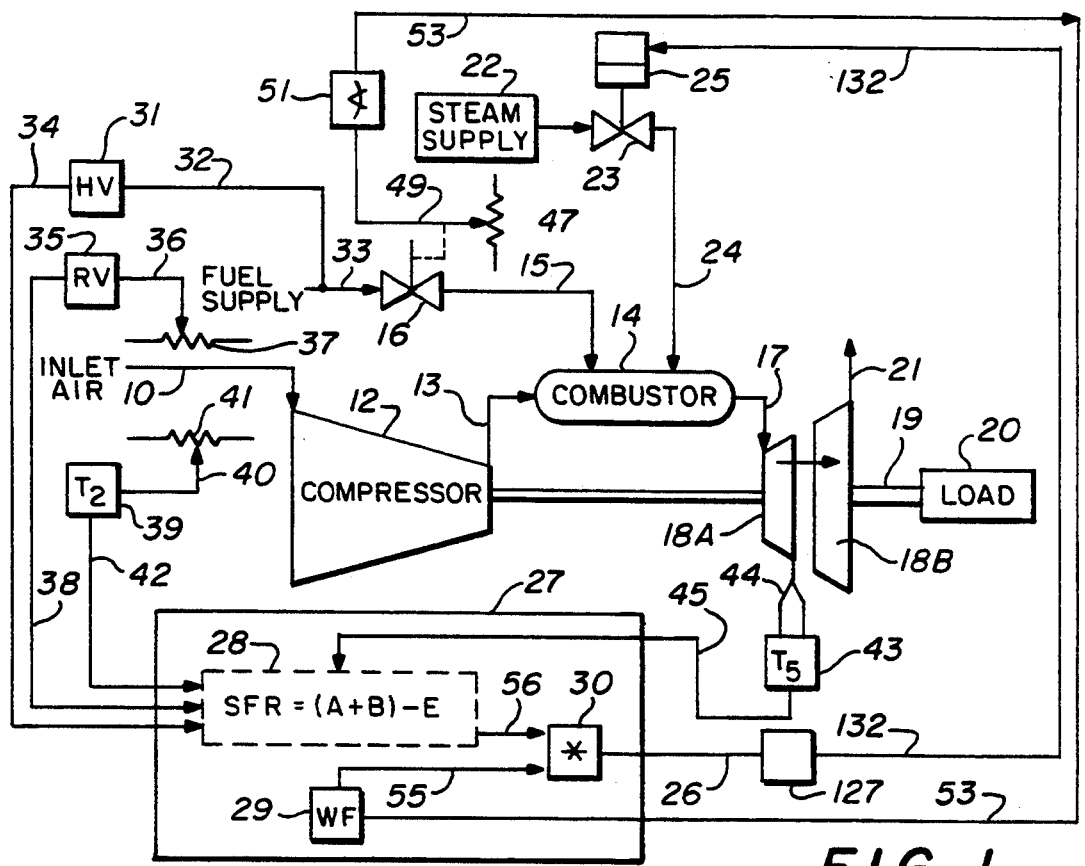
FIG. I
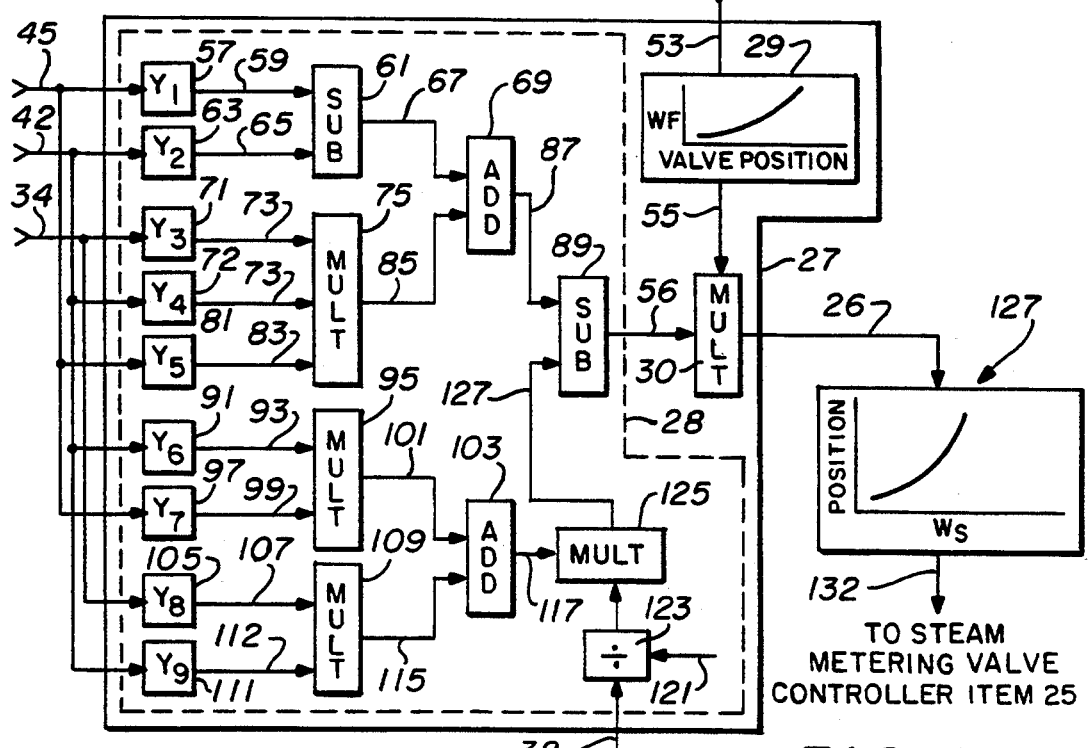
FIG. II

$NO_x$ AND CO CONTROL FOR GAS TURBINE

FIELD OF THE INVENTION

The present relates to a system for automatically maintaining gas turbine nitrogen oxide ($NO_x$) emissions at specific levels in parts per million by volume during all ambient conditions from no load to full load fuel flows while minimizing CO emissions. More particularly, the invention relates to a device and method for automatically adjusting input steam flow rate to the turbine combustor to maintain constant nitrogen oxide emissions substantially equal to or less than maximum permissible amounts.

BACKGROUND OF THE INVENTION

Gas turbines are well known in the art. They include a compressor which compresses the inlet air and transfers it to the combustor. The combustor has fuel added which, when ignited, heats the compressed air and produces output gases which are then expanded across a turbine to provide the power output. The combustor burns fossil fuels, such as natural gas, in the gaseous state. In many cases, water is added in the combustor to bring the combustor temperature down.

Because of the use of the fossil fuels as the combustor fuel, nitrogen oxide emissions ($NO_x$) and carbon monoxide (CO) emissions are found in the exhaust gases. The gas turbines are designed to maintain a government imposed minimum level of $NO_x$ and CO by utilizing water injection in the combustor which is added at the same time as the fuel. Water cools the combustor and reduces the temperature of the output gases which reduces $NO_x$ but increases CO emissions. It is difficult to maintain constant $NO_x$ and minimum CO emissions because of variable operating conditions of the gas turbine such as inlet air temperature, relative humidity and various loads on the turbine, all of which cause the system to operate so as to change the emissions.

Commonly assigned U.S. Pat. No. 4,733,527 disclosed apparatus that overcame the disadvantages of the prior art by providing a system for estimating the desired water/fuel ratio to provide a substantially constant $NO_x$ emission as a function of corrected turbine speed, inlet air temperature, load and the amount of fuel being consumed as determined by the fuel metering valve position. There is a linear correlation between the water/fuel ratio and the gas generator speed corrected for inlet air temperature to maintain $NO_x$ emissions at a minimum constant level. However, the system disclosed in U.S. Pat. No. 4,733,527 has relatively flat curves representing a given water/fuel ratio for a given corrected gas generator speed. That is, the water/fuel ratio changes slowly with a given change in corrected gas generator speed. This means that the water/fuel ratio control system must be very sensitive to small changes in the water/fuel ratio for a given change in the rotational corrected speed of the gas generator for any given $NO_x$ level.

The present invention defines a method and apparatus for maintaining a constant level of $NO_x$ and minimal CO emissions from a gas turbine by injecting a calculated amount of steam into the combustion section of the gas turbine. Data has been generated that defines the relationships between a constant level of $NO_x$ emissions and the steam-to-fuel ratio required to maintain the $NO_x$ emissions at this level. The present invention utilizes these relationships to provide a method and apparatus for maintaining the amount of $NO_x$ at a constant level and minimizing CO emissions by adjusting the amount of steam injected to compensate for variations in gas turbine load, ambient temperature, relative humidity and fuel calorific heating value. The present invention also defines a means of determining the required steam-to-fuel ratio, determining the amount of fuel being used, and positioning the steam metering valve according to the amount of steam required. Steam injection tends to reduce the temperature of the combustion process which, in turn, helps reduce the amount of $NO_x$, but increases the CO emissions.

The use of steam to reduce the amount of $NO_x$ emissions has been done in the prior art by scheduling the amount of steam to be injected either manually or automatically based on a relationship to one variable, but there are several variables that affect the amount of steam required. These variables are ambient air temperature, relative humidity, fuel heating value and turbine firing temperature. With all of these variables affecting the amount of $NO_x$ and CO emissions, a manual system or a one variable system is not practical for trying to maintain a constant level of such emissions.

In the present invention, the actual steam required is a direct calculation found by multiplying the steam-to-fuel ratio (SFR) by the fuel flow according to the equation $W_s = SFR \times W_f$ where $W_s$ equals steam required in pounds per hour and $W_f$ equals fuel flow in pounds per hour. The fuel flow in pounds per hour is determined by a fuel metering valve position where the position of the fuel metering valve (or angular valve opening) is directly proportional to fuel flow and is measured by an electromechanical device mounted directly on the fuel metering valve. To maintain $NO_x$ emissions at a constant level, and minimize CO emissions, steam is injected from a steam supply through a steam metering valve into the combustor where it mixes with the combustion air and fuel. This mixing tends to reduce the combustion temperature which, in turn, reduces the amount of oxides of nitrogen formation in the exhaust gases. In order to maintain a constant level of $NO_x$ over the operating range of the gas turbine, the amount of steam injected needs to vary based on fuel flow, inlet ambient air temperature, relative humidity, fuel heating value and turbine load which is a function of the turbine firing temperature. As stated earlier, the fuel flow is calculated by measuring the angular position or opening of the fuel metering valve. The relative humidity is measured by a relative humidity sensor. The fuel heating value is measured by a calorimeter. The ambient air temperature is measured by a temperature probe and the turbine firing temperature is also measured by temperature probes. These signals provide the necessary information to a controller which may be either an analog device or a digital device. The controller receives the information from the various sensors and calculates fuel flow ($W_f$) and the steam-to-fuel ratio (SFR). The controller then multiplies these two values to obtain the required steam flow that will maintain $NO_x$ at a constant level.

Thus, the present invention relates to a method and system for utilizing steam injection to maintain substantially constant $NO_x$ from the exhaust gases of a conventional gas turbine while minimizing CO emissions.

It is an object of the present invention to calculate the steam-to-fuel ratio and the fuel consumption in pounds per hour and then multiply these two quantities together to obtain the desired steam injection in pounds per hour and develop an electrical signal that can be used to control the steam metering valve to generate the desired amount of steam injection.

It is still another object of the present invention to provide a calculated steam-to-fuel ratio based on fuel flow, inlet air temperature, relative humidity, fuel heating value and turbine load which is a function of the turbine firing temperature.

It is also an object of the present invention to determine the desired steam/fuel ratio, determine the amount of fuel being utilized, multiply the desired steam/fuel ratio times the amount of fuel being used to obtain the amount of steam that is to be used and then setting the steam metering valve according to the amount of steam desired.

It is yet another object of the present invention to provide an emissions control system that is designed to control $NO_x$ emission levels within specified limits for a range of operation of a gas turbine between minimum load and maximum load fuel flows during all ambient conditions including ambient temperature and relative humidity variations.

It is still another object of the present invention to provide a method and apparatus that will modify a steam-to-fuel ratio necessary to maintain constant emission levels for the given operating conditions on the basis of actual fuel flow into a gas turbine with the system generating a signal that represents the steam metering valve position required to inject the necessary steam into the turbine combustor to obtain the desired steam-to-fuel ratio.

SUMMARY OF THE INVENTION

Thus the present invention relates to a system for automatically maintaining substantially constant nitrogen oxide emissions while minimizing carbon monoxide emissions from a gas turbine burning a gaseous or liquid fossil fuel injected into a combustor through at least one fuel input valve comprising means for determining the actual fuel flow, $W_f$, injected into the combustor, a steam source, a steam control valve coupled between the steam source and the combustor for injecting a predetermined amount of steam, $W_s$, into the combustor; and means for automatically controlling the steam valve to inject a steam flow, $W_s$, into the combustor that provides a predetermined steam-to-fuel ratio, SFR, that will maintain substantially constant $NO_x$ while minimizing CO emissions from the gas turbine according to the formula that $W_s = SFR \cdot W_f$ where $W_s$ equals steam flow in pounds per hour, $W_f$ equals the fuel flow in pounds per hour and SFR equals the steam/fuel ratio corrected for variations in relative humidity, ambient temperature, fuel heating value, and turbine firing temperature.

The invention also relates to a method for automatically maintaining a substantially constant nitrogen oxide and minimum carbon monoxide emissions from a gas turbine burning a gaseous or liquid fossil fuel injected into a combustor through at least one fuel input valve, the method comprising the steps of determining the actual fuel flow, $W_f$, injected into the combustor, providing a steam source, coupling a steam valve between the steam source and the combustor for injecting a predetermined amount of steam, $W_s$, into the combustor and automatically controlling the steam valve to provide a steam flow, $W_s$, that provides a predetermined steam-to-fuel ratio, SFR, that will maintain substantially constant $NO_x$ and minimum CO emissions from the gas turbine according to the formula $W_s$ equals SFR x $W_f$, where $W_s$ equals steam flow in pounds per hour, $W_f$ equals fuel flow in pounds per hour and SFR equals steam-to-fuel ratio corrected for variations in relative humidity, ambient temperature, fuel heating value and turbine firing temperature.

BRIEF DESCRIPTION OF THE DRAWINGS

These and other objects of the present invention will be disclosed in conjunction with the detailed description and the accompanying drawings in which like numerals represent like elements and in which:

FIG. 1 is a basic schematic diagram of a gas turbine utilizing the present invention to control the steam flow in pounds per hour being injected into the combustor under varying ambient air temperature, relative humidity, fuel heating value, fuel flow rate and turbine firing temperature;

FIG. 11 is a block diagram of the controller 27 illustrated in FIG. 1 showing the details thereof.

DETAILED DESCRIPTION OF THE DRAWING

Figure 2:
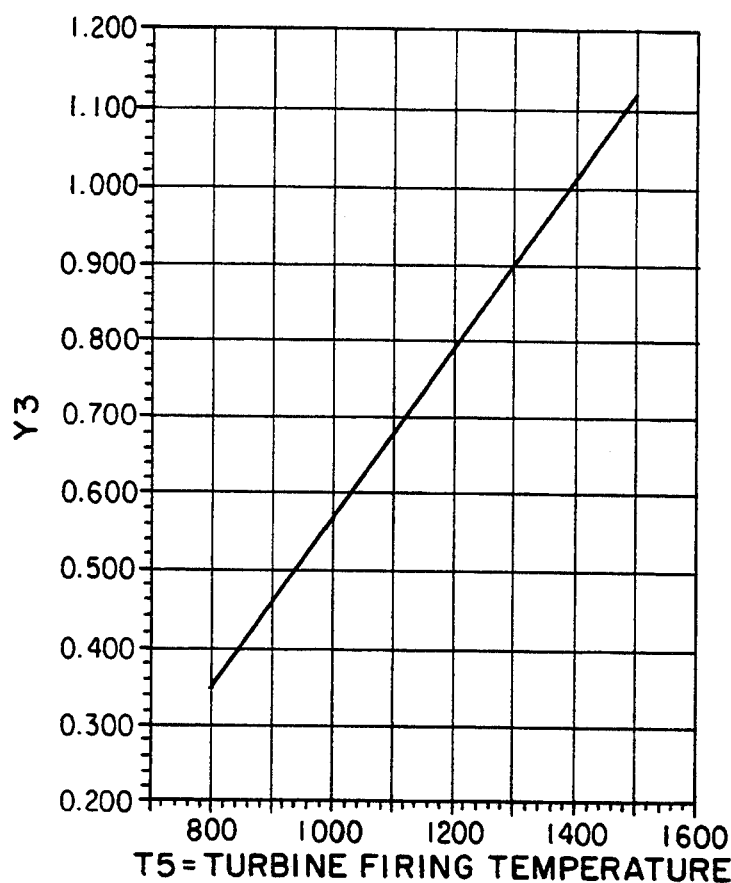
FIG. 2 is a graph of the steam-to-fuel ratio, $Y_1$, vs. the turbine firing temperature for a given set of conditions, i.e., ambient temperature, relative humidity and fuel heating value.

A conventional gas turbine incorporating the present invention is illustrated in FIG. 1. Inlet air enters a conduit 10 where it is drawn into the axial compressor section 12 where the air is compressed and heated as a result of the compression process. From the compressor 12, the high pressure air is transported through a conduit 13 to the combustor 14 where it is combined with fuel delivered from a fuel supply 33 through a fuel metering valve 16 and conduit 15. The fuel and air mixture is burned in the combustor 14 and then moved to the turbine section 18A through conduit 17. The hot gases are expanded through turbine sections 18A and 18B which creates a rotating force to drive the axial compressor section 12 and the load 20 through shaft 19. From the second turbine section 18B, the gas is exhausted to the atmosphere via conduit 21. This exhaust gas contains CO and oxides of nitrogen, the pollutants that the present invention is designed to minimize and maintain at a constant level. The desired results of the present invention are accomplished by injecting steam from a steam supply 22 through a steam metering valve 23 and conduit 24 into the combustor 14 where it mixes with the combustion air and fuel. This mixing tends to reduce the combustion temperature which, in turn, reduces the amount of CO and oxides of nitrogen formation in the exhaust gas. In order to maintain a constant level of $NO_x$ emissions over the operating range of the gas turbine, the amount of steam injected needs to vary based on fuel flow, inlet air temperature, relative humidity, fuel heating value, and turbine load which is a function of the turbine firing temperature.

The present invention calculates fuel flow by measuring the angular position or opening of the fuel metering valve 16. The wiper arm 49 of a potentiometer 47 moves as the position of the fuel metering valve 16 is changed. This generates a signal to amplifier 51 which produces a signal on line 53 that is proportional to the fuel metering valve 16 position and thus is proportional to the fuel being coupled to the combustor in pounds per hour. That signal on line 53 is coupled to circuit 29 in controller 27. Since the signal on line 53 is proportional to the position of the fuel metering valve 16 and this relationship is known, circuit 29 may be a memory device which stores data representing the amount of fuel, $W_f$, being passed through the fuel value 16 for any given valve position. This data may be entered into memory 29 through any well-known means such as a keyboard or other well-known input device not shown. The actual fuel valve position signal on line 53 may then be compared in circuit 29 with the memory signal representing the known amount of fuel flow for any given valve position thus generating an output signal on line 55 representing the known amount of fuel flow for any given position of valve 16. Thus the signal on line 55 represents the actual fuel flow in pounds per hour injected into the combustor 14 based upon the actual position of the fuel valve 16.

The relative humidity is measured in any well-known manner as by a relative humidity sensor 35. The variable resistor 37 may provide an adjustment signal on line 36 to the sensor 35. Sensor 35 generates an electrical signal on line 38 proportional to the percent of relative humidity. The fuel heating value is measured by a calorimeter 31 in any well-known manner by sampling the fuel supply 33 through conduit 32. It generates an electrical signal on line 34 representing the fuel heating value in BTU/SCF. The ambient air temperature is measured by a temperature probe 39 in the vicinity of the inlet air 10 and generates an output signal on line 42 representing ambient air temperature. Temperature probe 41 acts as a variable resistance and changes resistance as temperature changes which provides an electrical output signal from $T_2$ device 39. The turbine firing temperature has a temperature probe 43 whose thermocouple 44 is inserted in the turbine section 18A and generates an electrical signal on line 45 proportional to the turbine firing temperature.

Thus, the signal on line 34 representing the fuel heating value, the signal on line 38 representing the relative humidity, the signal on line 42 representing the ambient air temperature and the signal on line 45 representing the turbine firing temperature are all coupled to processor 28 in controller 27. Processor 28 can be either an analog device or a digital device. It receives the information from the various sensors and calculates fuel flow, $W_f$, on line 55 and the steam-to-fuel ratio (SFR) on line 56. The controller 27 then multiplies these two values at multiplier 30 to obtain the required steam flow, $W_s$, that will maintain the NO emissions at a constant level.

Thus, (1) $W_s = SFR \cdot W_f$ (2) $= [(A + B) - E] \cdot W_f$ (3) $= [((Y_1 - Y_2) + (Y_3 \cdot Y_4 \cdot Y_5)) - E] \cdot W_f$ (4) $= [((Y_1 - Y_2) + (Y_3 \cdot Y_4 \cdot Y_5)) - (C + D) \cdot RH/100] \cdot W_f$ (5) $= [((Y_1 - Y_2) + (Y_3 \cdot Y_4 \cdot Y_5)) - ((Y_6 \cdot Y_7) + (Y_8 \cdot Y_9)) \cdot RH/100] \cdot W_f$ where (6) $Y_1 = 0.0011T_5 - 0.5325$, where $T_5$ equals turbine firing temperature;

(7) $Y_2 = 0.0003T_2$, where $T_2$ equals ambient air temperature in degrees Fahrenheit;

(8) $Y_3 = K_1HV + K_2$, where HV equals fuel heating value in BTU/SCF and $K_1$ and $K_2$ are constants that vary with the heating value of the fuel;

(9) $Y_4 = 0.001795T_2 + 0.894100$, where $T_2$ is ambient air temperature less than 59° F.; and

(10) $Y_4 = 1.00$, when $T_2$ is equal to or greater than 59° F.;

(11) $Y_5 = 0.000741T_5 - 0.092530$, where $T_5$ equals turbine firing temperature;

(12) $Y_6 = K_1T_2$ plus or minus $K_2$ for four ranges of value for $T_2$, where $T_2$ equals ambient air temperature and $K_1$ and $K_2$ are constants that vary with the ambient air temperature;

(13) $Y_7 = 0.00047T_5 + 0.307$, where $T_5$ equals turbine firing temperature;

(14) $Y_8 = K_1HV + K_2$ (four equations), where HV equals fuel heating value in BTU/SCF and $K_1$ and $K_2$ are constants that vary with heating value of the fuel;

(15) $Y_9 = 0.00322T_2 + 0.050$ for $T_2 \leq 67.4°$ F.; and

(16) $Y_9 = 0.22500T_2 - 1.250$ for $67.4°$ F. $< T_2 \leq 100°$ F. where $T_2$ equals ambient air temperature and where RH equals relative humidity in percent.

The above equations are derived from the graphs illustrated in FIGS. 2-10. Note that all of the constants in the equations are for a specific case but the general relationships are valid for a gas turbine engine.

FIG. 2 is a graph that shows the steam-to-fuel ratio as a function of turbine firing temperature ($T_5$) for a given relative humidity, fuel gas composition and ambient temperature (100° F.). The graph further shows that the steam-to-fuel ratio is a linear function of load since load can be directly correlated to turbine firing temperature $T_5$. The equation for the graph of FIG. 2 is (6) $Y_1 = 0.0011 T_5 - 0.5325$, where $T_5$ is the turbine firing temperature.

Figure 3:
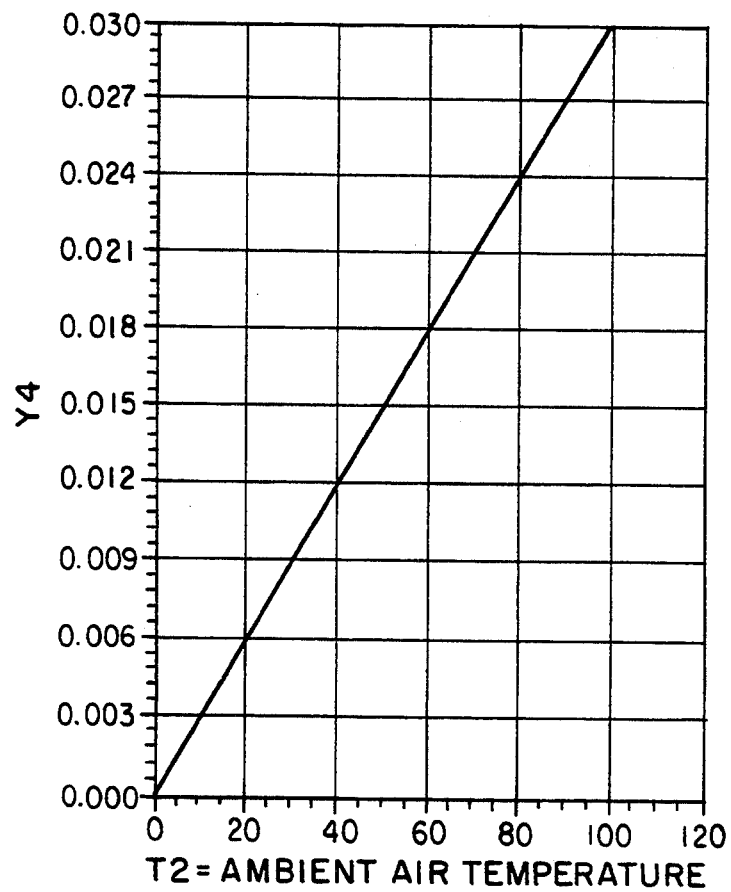
FIG. 3 is a graph that shows a correction factor for ambient air temperature, $T_2$, that is applied to the steam-to-fuel ratio for a given turbine firing temperature, $T_5$, as set forth in the graph in FIG. 2.

FIG. 3 is a graph that shows a correction factor for ambient air temperature that is applied to the steam-to-fuel ratio versus $T_5$ relationship that was presented in FIG. 2. FIG. 3 is a straightline graph and the correction factor is defined by the equation $$Y_2 = 0.0003 T_2. \tag{7}$$

The result of the two calculations for $Y_1$ and $Y_2$ is used in a certain formula that generates the value of "A" in the basic equation. The formula is $$A = Y_1 - Y_2. \tag{17}$$

Figure 4:
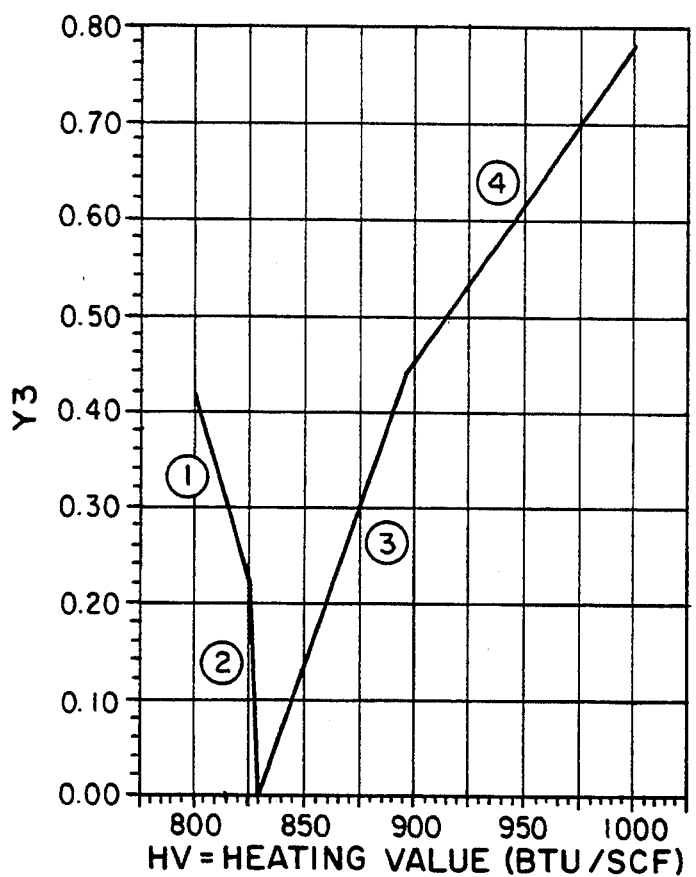
FIG. 4 is a graph showing the relationship between the steam-to-fuel ratio, $Y_3$, and the fuel heating values for a given ambient temperature, $T_2$, and turbine firing temperature, $T_5$, and is defined as a four-segment characterized line that provides an offset or bias to the steam-to-fuel ratio as a function of the fuel heating value expressed as BTU/SCF.

FIG. 4 is a graph of the relationship between the steam-to-fuel ratio and fuel heating value for a given ambient temperature and load. This relationship is defined as a four-segment characterized line that will provide a bias or offset to the steam-to-fuel ratio as a function of the fuel heating value, HV, expressed as BTU/SCF. The four segments are defined as follows:

(8) $Y_3 = -0.008333 HV + 7.084973$ for the range $800 < HV \leq 825$ BTU/SCF $Y_3 = -0.042000 HV + 34.86000$ for $825 < HV \leq 830$ BTU/SCF $Y_3 = +0.006561 HV - 5.445298$ for $830 < HV \leq 896$ BTU/SCF $Y_3 = +0.003451 HV - 2.65900$ for $896 < HV \leq 998$ BTU/SCF.

Figure 5:
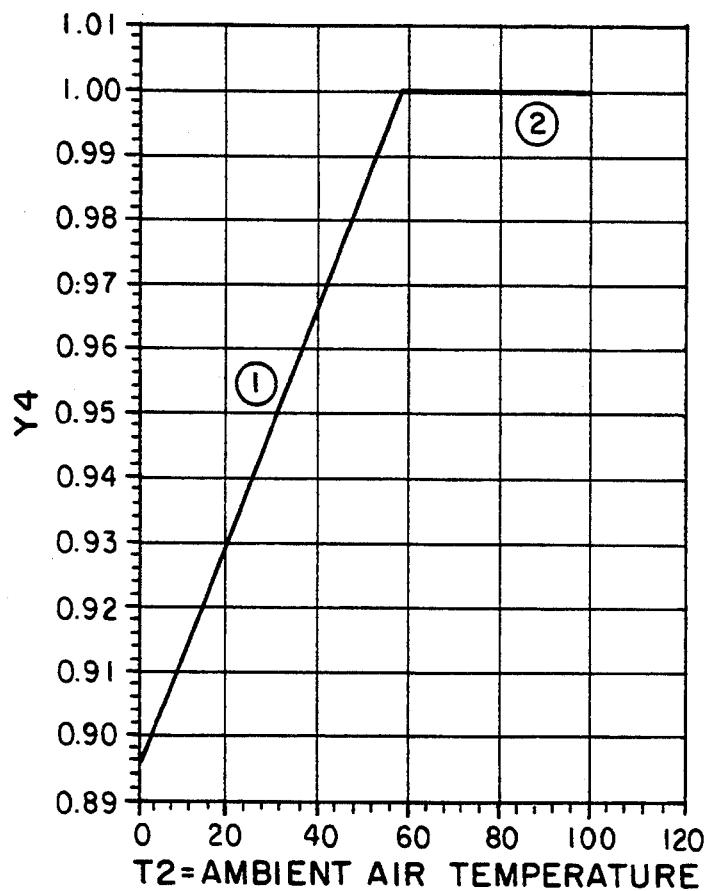
FIG. 5 is a graph illustrating the correction factor, $Y_4$, that ambient temperature, $T_2$, applies to the steam-to-fuel ratio correction factor for fuel heating value and is characterized by a two-segment line.

FIG. 5 is a graph of the relationship that ambient temperature $T_2$ has on the steam-to-fuel ratio versus fuel heating value, HV, as shown in FIG. 4. This relationship is used to calculate $Y_4$ which is a correction factor used in the calculation of the constant "B" in the basic equation. In the formula $$B = Y_3 \cdot Y_4 \cdot Y_5 \tag{18}$$

The value of $Y_4$ is expressed by the formula (9) $Y_4 = 0.001795 T_2 + 0.894100$ for a temperature $T_2 \leq 59°$ F.; and

(10) $Y_4 = 1$, a constant for a temperature $T_2 > 59°$ F. where $T_2$ is expressed in degrees Fahrenheit.

Figure 6:
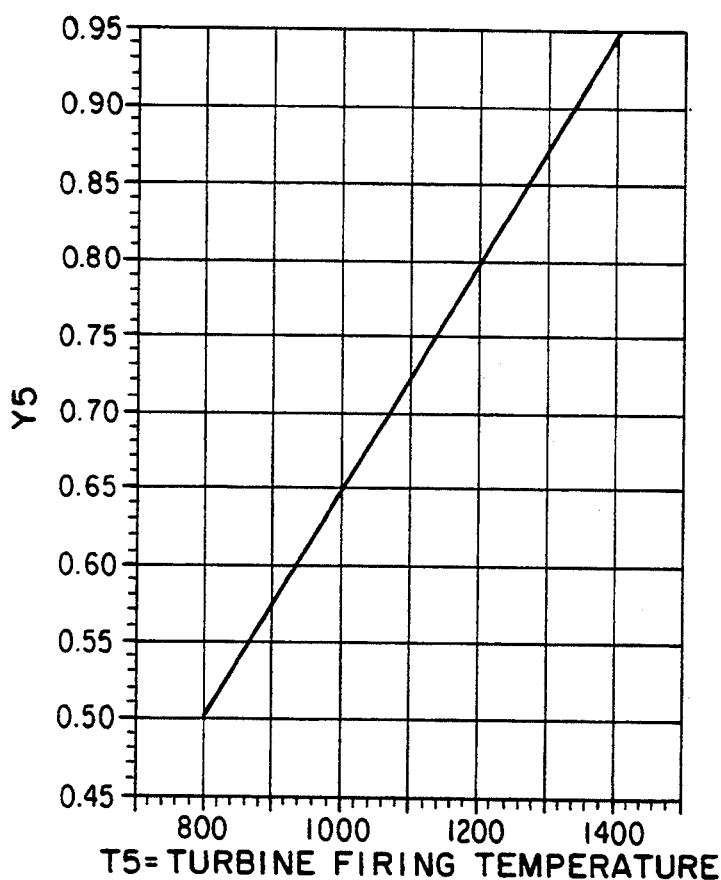
FIG. 6 is a graph illustrating the correction factor, $Y_5$, that modifies the steam-to-fuel ratio offset vs. fuel heating value shown in FIG. 4 for changes in turbine firing temperature, $T_5$.

FIG. 6 shows the correction factor $Y_5$ that modifies the steam-to-fuel ratio offset versus fuel heating value shown in FIG. 4 for changes in turbine firing temperature $T_5$. This relationship is expressed by the formula $$Y_5 = 0.000741 T_5 - 0.092530 \tag{11}$$

where the turbine firing temperature is in degrees Fahrenheit. With the variables $Y_3$, $Y_4$, and $Y_5$, the value of "B" is calculated which provides the steam-to-fuel ratio offset for fuel heating value.

The variables C and D are used to calculate a humidity correction to the steam-to-fuel ratio. The constant "C" provides a humidity correction as a function of ambient temperature $T_2$ and turbine firing temperature $T_5$. The variable "C" is calculated by the formula:

$$C = Y_6 \cdot Y_7 \tag{19}$$

Figure 7:
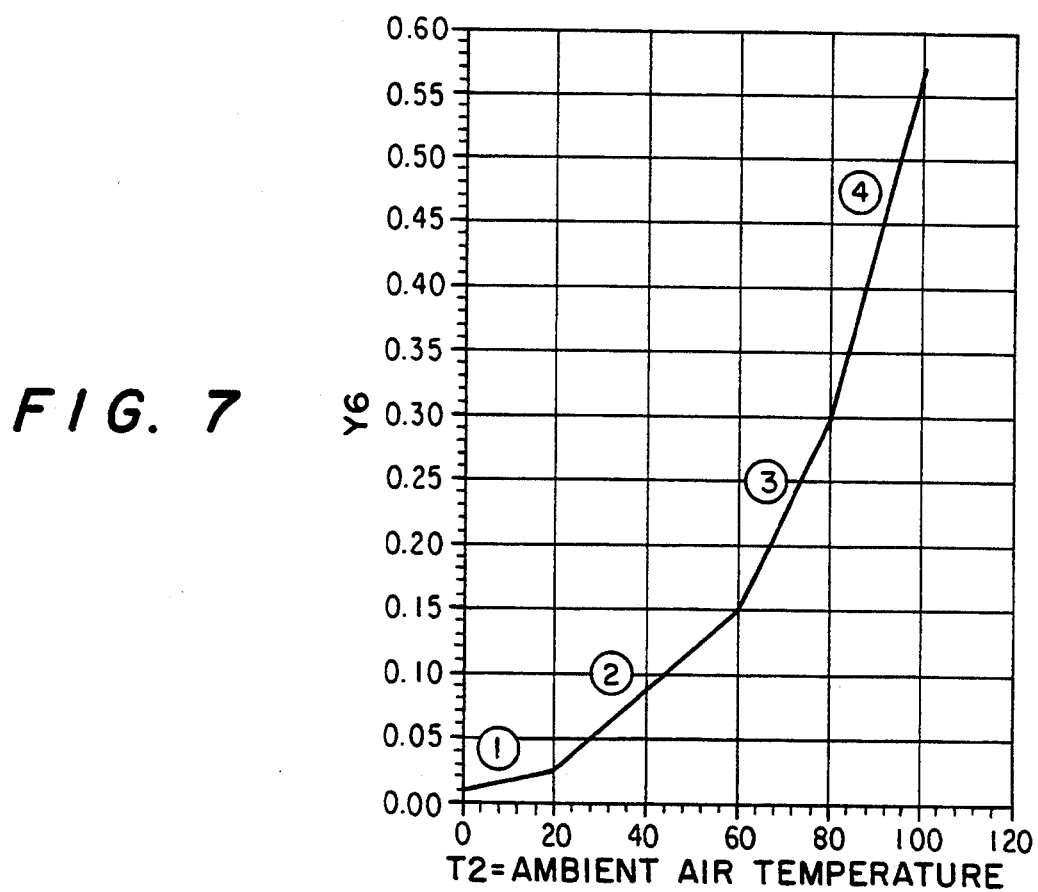
FIG. 7 is a graph of the correction factor, $Y_6$, for the steam-to-fuel ratio for humidity variations over a four-segment range of ambient air temperatures from 0° F. to 100° F.

$Y_6$ is the correction of the steam-to-fuel ratio for humidity variations as defined by the graph in FIG. 7.

This curve is shown as a four-segment characterized line and each section thereof can be defined as follows:

(12) $Y_6 = 0.000850 T_2 + 0.010$, where $0°$ F. $< T_2 \leq 20°$ F.

$Y_6 = 0.002974 T_2 + 0.032486$, where $20°$ F. $< T_2 \leq 60°$ F.

$Y_6 = 0.007333 T_2 - 0.289665$, where $60°$ F. $< T_2 \leq 80°$ F.

$Y_6 = 0.013150 T_2 - 0.755$, where $80°$ F. $< T_2 \leq 100°$ F.

Figure 8:
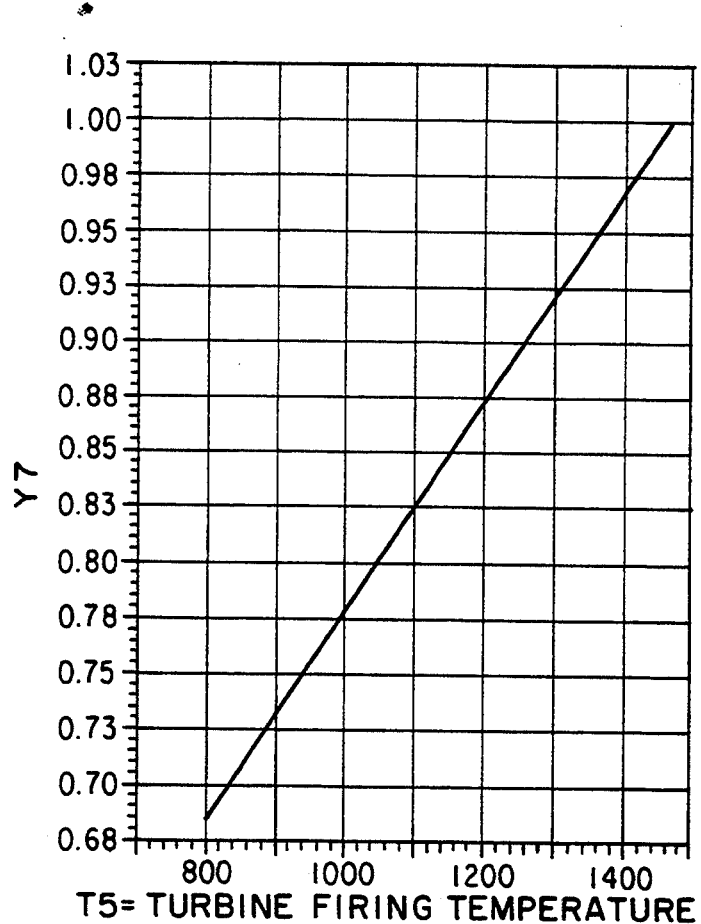
FIG. 8 is a graph of the correction factor, $Y_7$, for the steam-to-fuel ratio for humidity variations as a function of turbine firing temperature.
Figure 9:
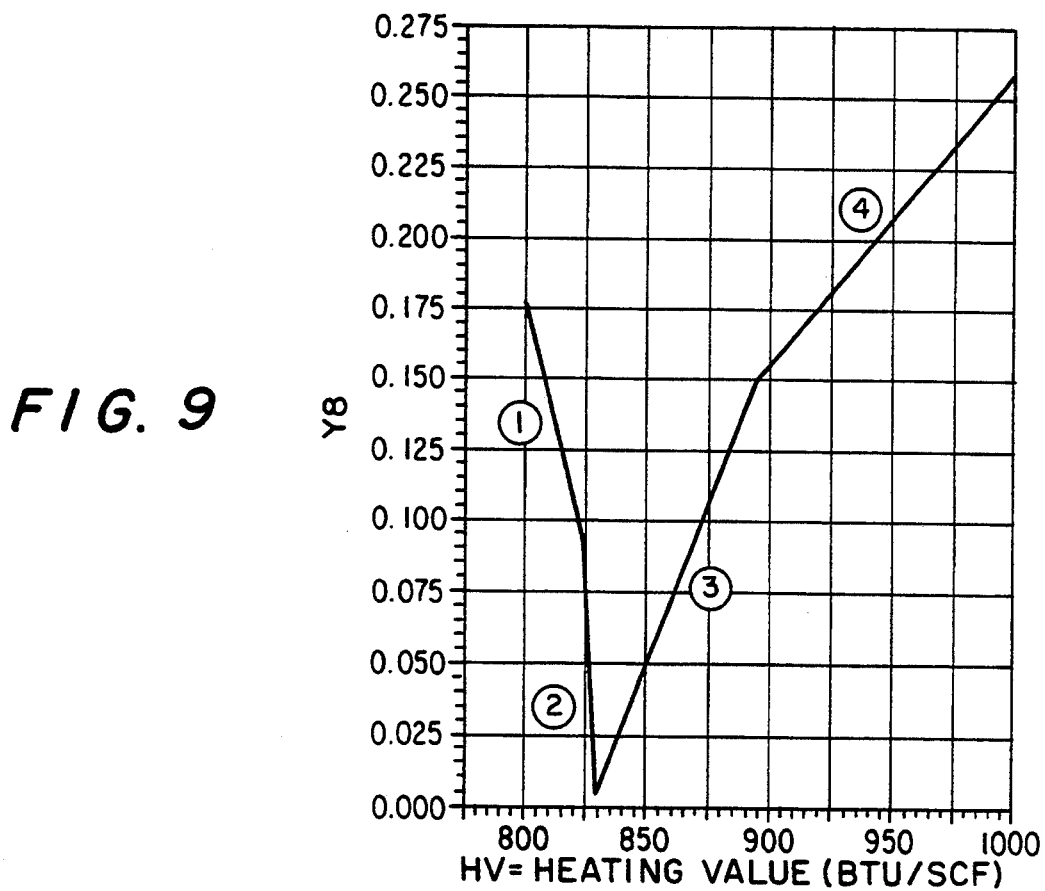
FIG. 9 is a graph of the correction factor, $Y_8$, for the steam-to-fuel ratio versus humidity as a function of fuel heating value and is a four-segment line for fuels having a value in BTU/SCF between 800 and 998.

$Y_7$ is the correction of the steam-to-fuel ratio for humidity variations as a function of turbine firing temperature $T_5$ and is shown by the graph in FIG. 8. $Y_7$ is described by the formula:

(13) $Y_7 = 0.00047 T_5 + 0.307$, where $T_5$ is the turbine firing temperature in degrees Fahrenheit.

The variable "D" is calculated by the formula:

$$D = Y_8 \cdot Y_9 \tag{20}$$

$Y_8$ is the correction of the steam-to-fuel ratio versus humidity as a function of fuel heating value in BTU/SCF. $Y_8$ is a four-segment characterized line illustrated in FIG. 9. The four segments can be defined mathematically as follows:

(14) $Y_8 = -0.003587 HV + 3.0466$, where $800 < HV$ which $\leq 825$ BTU/SCF $Y_8 = -0.017520 HV + 14.54160$, where $825 < HV \leq 830$ BTU/SCF $Y_8 = +0.002274 HV - 1.88380$, where $830 < HV \leq 896$ BTU/SCF $Y_8 = +0.001057 HV - 0.796849$, where $896 < HV \leq 998$ BTU/SCF.

Figure 10:
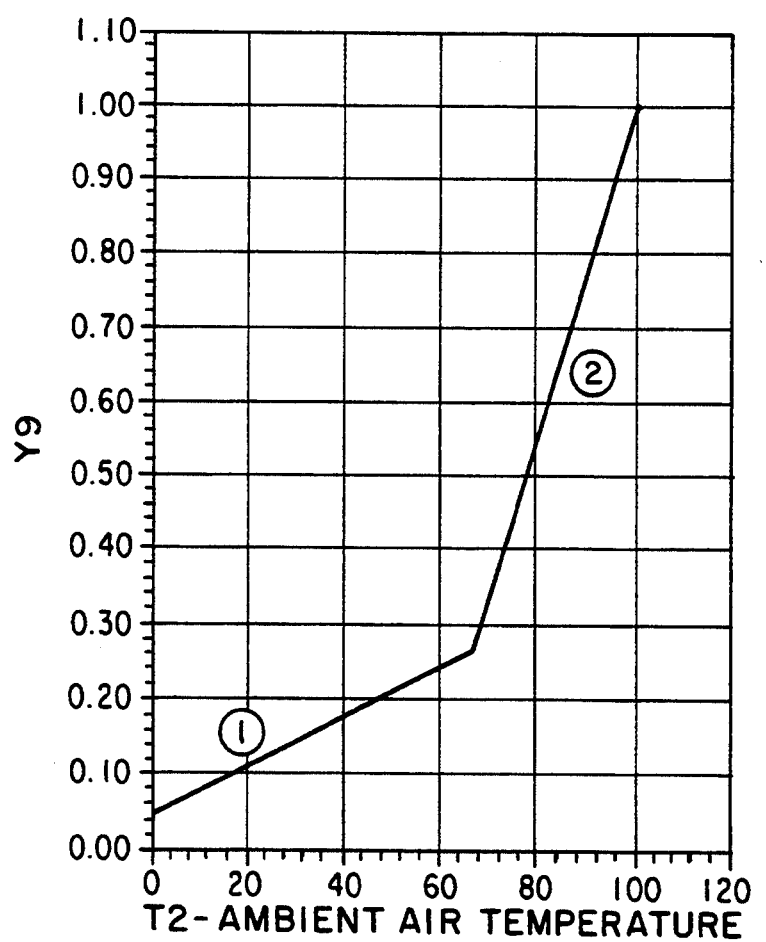
FIG. 10 is a graph of the correction factor, $Y_9$, for the steam-to-fuel ratio versus humidity as a function of ambient air temperature and is a two-segment line covering an ambient temperature below 67.4° F. and an ambient temperature greater than 67.4° F. and equal to or less than 100° F.

$Y_9$ is the correction of the steam-to-fuel ratio versus humidity as a function of ambient temperature, $T_2 \cdot Y_9$ is a two-segment characterized line as illustrated in FIG. 10. The two segments are defined mathematically as follows:

(15) $Y_9 = 0.003220 T_2 + 0.050$ where $T_2 \leq 67.4°$ F.

$Y_9 = 0.022500 T_2 - 1.250$, where $67.4°$ F. $< T_2 \leq 100°$ F. $T_2$ is the ambient temperature in degrees Fahrenheit.

With "C" and "D" now defined by equations (19) and (20), the humidity correction factor to the steam-to-fuel ratio is calculated by the formula

(21) $E = (C + D) RH/100$ where RH/100 is the relative humidity in %.

This leads to the basic formula in equation (2) for determining the steam-to-fuel ratio where SFR equals $(A + B) - E$. A, B and E are all calculated above in equations (17), (18) and (21) and set forth the required steam-to-fuel ratio.

As stated earlier, the actual steam required is now a direct calculation found by multiplying the steam-to-fuel ratio SFR by the fuel flow where $W_s = SFR \cdot W_f$.

FIG. 11 is a block diagram of the controller 27 and its various components that solve the equations $Y_1 - Y_9$ and determine the desired SFR for a given fuel flow, ambient temperature, turbine firing temperature, heating fuel value, and relative humidity. In FIG. 11, the fuel flow, $W_f$, in pounds per hour and denoted by the electrical signal on line 53 is coupled to the circuit device 29 in the controller 27. As stated earlier, since there is a known relationship between valve position and fuel flow, the unit 29 can be simply a memory which looks at the electrical signal on line 53 and converts it to an output signal on line 55 in a well-known manner which is the equivalent of the fuel flow in pounds per hour. That signal is coupled to multiplier 30 as one input. The calculated steam-to-fuel ratio on line 56 is the other input that is coupled to multiplier 30. The steam-to-fuel ratio signal on line 56 is calculated by the processor 28 as illustrated. Thus the electrical signal on line 45 representing the turbine firing temperature $T_5$ is coupled to circuit 57 which stores the equation for $Y_1$ and simply utilizes the signal representing turbine firing temperature $T_5$ on line 45 to plug into the equation and solve it generating an output on line 59 that is coupled to subtractor 61. In like manner, the signal on line 42 representing the ambient temperature $T_2$ is coupled to electrical circuit 63 which stores the equation for $Y_2$. Again, circuit 63 simply solves the equation for the given value of $T_2$ as represented by the signal on line 42. The output is coupled on line 65 to subtractor 61. Subtractor 61 subtracts $Y_2$ from $Y_1$ to obtain the value "A" on line 67 which is coupled to adder 69.

The heating value signal on line 34 is coupled to electrical circuit 71 which solves one of the four equations for $Y_3$ depending upon the value of the signal on line 34. The output is coupled on line 73 to multiplier 75. In like manner, the ambient temperature signal $T_2$ on line 42 is coupled to circuit 72 which solves one of the four equations $Y_4$ depending upon the range of the ambient temperature and couples the result on line 79 to multiplier 75. Finally, the turbine firing temperature signal $T_5$ on line 45 is also coupled to circuit 81 which solves the equation $Y_5$ for the particular value of $T_5$ given and couples the output on line 83 to multiplier 75. Multiplier 75 multiplies the quantities $Y_3$, $Y_4$ and $Y_5$ together to obtain the value "B" on line 85 which is also coupled to adder 69. Adder 69 adds the quantities A and B and generates an electrical signal on line 87 that equals A+B and that signal is coupled to the subtractor 89.

In like manner, the ambient air temperature signal $T_2$ on line 42 is coupled to circuit 91 which solves one of the four equations depending upon the value of $T_2$ and couples the result on line 93 to the multiplier 95 as one input. The turbine firing temperature signal $T_5$ on line 45 is coupled to circuit 97 which solves the equation $Y_7$ based upon the value of the $T_5$ signal and generates an output on line 99 to multiplier 95. Multiplier 95 multiplies the signals $Y_6$ and $Y_7$ to obtain an electrical signal representing the quantity "C" on line 101 which is coupled as one input to adder 103.

The heating value signal, HV, on line 34 is coupled to circuit 105 which solves one of the four equations $Y_8$ depending upon the value of the HV signal and generates an output signal on line 107 to multiplier 109. The ambient air temperature signal $T_2$ on line 42 is coupled to circuit 111 which solves one of the equations $Y_9$ depending upon the range of the $T_2$ signal and couples the output on line 112 to multiplier 109. Multiplier 109 multiplies together the signals $Y_8$ and $Y_9$ to obtain the "D" signal on line 115 as the second input to adder 103. Adder 103 adds the C and D sum signals on lines 101 and 115 and generates the resultant output on line 117. The relative humidity on line 38 is coupled to divider 119 where it is divided by the constant 100 on line 121 to obtain an output on line 123 that represents relative humidity in percent. Multiplier 125 multiplies the relative humidity in percent on line 123 times the C+D sum signal on line 117 to obtain the relative humidity correction E on line 127 which is also coupled as the other input to the subtractor 89. The subtractor 89 subtracts the quantity E on line 127 from the quantity (A+B) on line 87 to obtain the SFR signal on line 56 which is coupled to the multiplier 30 where, as stated previously, it is multiplied times the fuel flow in pounds per hour on line 55 thus solving the equation $$W_s = SFR \cdot W_f \tag{1}$$

and generating on line 26 a signal representing steam value. The signal on line 26 representing steam flow required, $W_s$, is coupled to circuit 127 which generates an output signal 132 that is coupled to steam metering valve controller 25 which adjusts the position of steam valve 23. Circuit 127 is similar to circuit 29 in that there is a direct relationship between steam valve angular position and steam flow, $W_s$, in pounds per hour (at specified steam conditions). The difference in circuit 127 is that desired steam flow is known and thus the required steam valve angular position is determined by circuit 127 to the point necessary to provide the proper steam supply to the combustor 14 on conduit 24.

Thus there has been disclosed a method and apparatus for maintaining a constant level of $NO_x$ and minimum CO emissions from a gas turbine. The emissions levels are controlled by injecting a calculated amount of steam into a combustion section of the gas turbine. The invention maintains the amount of $NO_x$ emissions at a constant level and minimizes CO emissions by adjusting the amount of steam injected to compensate for variations in gas turbine load (turbine firing temperature), ambient temperature, relevant humidity and fuel calorific heating values. The invention defines a means of determining the required steam-to-fuel ratio, means for determining the amount of fuel being used and means for positioning the steam metering valve according to the amount of steam required. The novel invention calculates fuel flow by measuring the angular position or opening of the fuel metering valve. The relative humidity is measured by a relative humidity sensor well known in the art. The fuel heating value is measured by a calorimeter, also well known in the art. The ambient air temperature is measured by a well-known temperature probe and the turbine firing temperature is also measured by a well-known temperature probe. These signals all provide the necessary information to the controller which can be either an analog device or a digital device. The controller receives the information from the various sources and calculates fuel flow and the steam-to-fuel ratio. The controller then multiplies these two values to obtain the required steam flow that will maintain the $NO_x$ emissions at a constant level and minimize CO emissions.

While the invention has been described in connection with a preferred embodiment, it is not intended to limit the scope of the invention to the particular form set forth, but, on the contrary, it is intended to cover such alternatives, modifications and equivalents as may be included within the spirit and scope of the inventions as defined by the appended claims.

We claim:

1. A system for automatically maintaining substantially constant $NO_x$ emissions and minimum CO emissions from a gas turbine burning a gaseous or liquid fossil fuel injected into a combustor through at least one fuel input valve comprising:

means for determining the actual fuel flow, $W_f$, injected into the combustor;

a steam source;

a steam valve coupled between said steam source and said combustor for coupling a predetermined amount of steam, $W_s$, into the combustor; and means for automatically controlling the steam valve position to provide a steam flow, $W_s$, that gives a steam-to-fuel ratio, SFR, that will maintain substantially constant nitrogen oxide emissions and minimal carbon monoxide emissions from the gas turbine according to the formula $(W_s = SFR \times W_f)$ where $W_s$ equals steam flow in pounds per hour, $W_f$ equals fuel flow in pounds per hour and SFR equals the steam-to-fuel ratio corrected for variations in relative humidity, ambient temperature, fuel heating value, and turbine firing temperature.

2. A system as in claim 1 wherein the steam-to-fuel ratio is a straightline function with respect to turbine firing temperature, $T_5$, according to the equation:

$$SFR = 0.0011 T_5 - 0.5325.$$

3. A system as in claim 2 further including:

means for generating a first electrical signal representing $W_f$ in pounds per hour as a function of the angular position of the fuel input valve;

means for generating a second electrical signal representing relative humidity in percent;

means for generating a third electrical signal representing a fuel heating value, HV, in BTU/SCF;

means for generating a fourth electrical signal representing ambient air temperature, $T_2$, in degrees Fahrenheit;

means for generating a fifth electrical signal representing turbine load as a function of turbine firing temperature $T_5$ in degrees Fahrenheit; and means for generating a sixth electrical signal representing steam flow, $W_s$ in pounds per hour as a function of said steam valve position.

4. A system as in claim 3 including means to generate a corrected steam/fuel ratio, SFR, according to the equation:

$$SFR = (A+B) - E$$

where

A = a correction factor to the SFR for ambient air temperature $T_2$;

B = a correction factor to the SFR with changes in fuel heating value, HFV, corrected for ambient temperature $T_2$ and turbine firing temperature $T_5$; and E = a correction factor to the SFR for humidity variations.

5. A system as in claim 4 wherein said means for generating the correction factor "A" further includes:

means for multiplying the fifth electrical signal, $T_5$, by the constant 0.0011 and subtracting 0.5325 from the result to obtain $Y_1$;

means for multiplying the fourth electrical signal, $T_2$, by the constant 0.0003 to obtain $Y_2$; and means for subtracting $Y_2$ from $Y_1$ according to the equation $(A = Y_1 - Y_2) = [0.0011 T_5 - 0.5325] - 0.0003 T_2$.

6. A system as in claim 5 wherein said means for generating the correction factor B further includes:

means for generating a first correction value by modifying the second electrical signal, HV, with constants for a range of HV values according to the equations:

$Y_3 = -0.008333 HV + 7.084973$ for $800 < HV \leq 825$ BTU/SCF $Y_3 = -0.042000 HV + 34.860000$ for $825 < HV \leq 830$ BTU/SCF $Y_3 = +0.006561 HV - 5.445398$ for $830 < HV \leq 896$ BTU/SCF $Y_3 = +0.003451 HV - 2.659000$ for $896 < HV \leq 998$ BTU/SCF means for generating a second correction factor by multiplying the fourth electrical signal, $T_2$, by a first constant and adding a second constant to the result according to the equations:

$Y_4 = 0.001795 T_2 + 0.894100$ for $T_2 < 59°$ and $Y_4 = 1$ for $T_2 \geq 59°$;

means for generating a third correction value by multiplying the fifth electrical signal, $T_5$, by a first constant and subtracting a second constant from the result according the equation:

$Y_5 = 0.00741 T_5 - 0.092530$; and means for multiplying the first, second and third correction values together to obtain the correction factor "B" according to the equation:

$$B = Y_3 \times Y_4 \times Y_5.$$

7. A system as in claim 6 wherein the correction factor, E, also includes correction factors C and D according to the equation:

$$E = (C+D) \cdot RH/100$$

where $C = Y_6 \times Y_7$, $Y_6$ equals a correction for SFR versus humidity variations (RH) as a function of ambient temperature $T_2$, and $Y_7$ is a function of the turbine firing temperature, $T_5$, and $$D = Y_8 \times Y_9,$$

where $Y_8$ equals a correction for SFR versus fuel heating value as a function of humidity (RH) and $Y_9$ is a function of ambient temperature, $T_2$.

8. A system as in claim 7 further comprising:

means for generating a correction factor $Y_6$ by varying the fourth electrical signal, $T_2$, with constants for a range of $T_2$ values according to the equations:

$Y_6 = 0.000850 T_2 + 0.010000$ for $0° F. < T_2 \leq 20° F.$ $Y_6 = 0.002974 T_2 - 0.032486$ for $20° F. < T_2 \leq 60° F.$ $Y_6 = 0.007333 T_2 - 0.289665$ for $60° F. < T_2 \leq 80° F.$ -continued $$Y_6 = 0.013150T_2 - 0.755000 \text{ for } 80° \text{ F.} < T_2 \leq 100° \text{ F.};$$

means for generating the correction factor, $Y_7$, by multiplying the fifth electrical signal $T_5$ by a constant 0.00047 and adding the constant 0.307 to the result according to the equation:

$$Y_7 = 0.00047T_5 + 0.307; \text{ and}$$

means for multiplying the signals $Y_6$ and $Y_7$ to obtain $$C = Y_6 \times Y_7.$$

9. A system as in claim 8 further including:
means for generating the correction factor, $Y_8$, by varying the third electrical signal with constants for a range of HV values according to the equations:

$$Y_8 = -0.003587HV + 3.046600 \text{ for } 800 < HV \leq 825$$
$$Y_8 = -0.017520HV + 14.54160 \text{ for } 825 < HV \leq 830$$
$$Y_8 = +0.002274HV - 1.883800 \text{ for } 830 < HV \leq 896$$
$$Y_8 = +0.001057HV - 0.796849 \text{ for } 896 < HV \leq 998;$$

means for generating the correction factor, $Y_9$, by varying the fourth electrical signal $T_2$ with constants for a range of $T_2$ values according to the equations:

$$Y_9 = 0.003220T_2 + 0.050000 \text{ for } T_2 < 67.4° \text{ F.}$$

and $$Y_9 = 0.022500T_2 - 1.250000 \text{ for } 67.4° \text{ F.} < T_2 \leq 100° \text{ F.};$$

and means for multiplying $Y_8$ and $Y_9$ to obtain $$D = Y_8 \times Y_9.$$

10. A system as in claim 9 wherein the means for generating the correction factor E comprises:
means for adding C+D,
means for dividing the second electrical signal, RH, by 100 to obtain a value representing relative humidity in percent; and
means for multiplying the sum of C+D by the divided second electrical signal, RH/100, to obtain the correction factor E for relative humidity.

11. A system as in claim 10 further including:
means for adding (A+B); and
means for subtracting E from said (A+B) to obtain $$SFR = (A+B) - E.$$

12. A system as in claim 11 further comprising means for multiplying $(A+B) - E = SFR$ by the first electrical signal, $W_f$, to obtain the sixth electrical signal, $W_s$.

13. A system as in claim 12 further comprising:
means for coupling said sixth electrical signal, $W_s$, to said steam valve for positioning said steam valve to allow sufficient steam to said combustor to satisfy the equation:

$$W_s = SFR \times W_f$$

thereby maintaining substantially constant $NO_x$ emissions and minimizing CO emissions from said turbine.

14. A method for automatically maintaining substantially constant nitrogen oxide and minimizing CO emissions from a gas turbine burning a gaseous or liquid fossil fuel injected into a combustor through at least one fuel input valve comprising the steps of:
determining the actual fuel flow, $W_f$, injected into the combustor;
providing a steam source;
coupling a steam valve between the steam source and the combustor for providing a predetermined amount of steam, $W_s$, into the combustor; and
automatically controlling the steam valve to provide a steam flow, $W_s$, that provides a steam-to-fuel ratio, SFR, that will maintain substantially constant nitrogen oxide and carbon monoxide emissions from the gas turbine according to the formula:

$$W_s = SFR \times W_f$$

where $W_s$ equals steam flow in pounds per hour, $W_f$ equals fuel flow in pounds per hour and SFR equals the steam-to-fuel ratio corrected for variations in relative humidity, ambient temperature, fuel heating value, and turbine firing temperature.

15. A method as in claim 14 further comprising the step of relating the turbine firing temperature, $T_5$, to the turbine load as a straightline function according to the equation:

$$SFR = 0.0011T_5 - 0.5325.$$

16. A method as in claim 15 further including the steps of:
generating a first electrical signal representing $W_f$ in pounds per hour as a function of the angular position of the fuel input valve;
generating a second electrical signal representing relative humidity, RH, in percent;
generating a third electrical signal representing fuel heating value, HV, in BTU/SCF;
generating a fourth electrical signal representing ambient air temperature, $T_2$, in degrees Fahrenheit;
generating a fifth electrical signal representing turbine load as a function of turbine firing temperature, $T_5$, in degrees Fahrenheit; and
generating a sixth-electrical signal representing steam flow, $W_s$, in pounds per hour as a function of said steam valve position.

17. A method as in claim 16 including the step of generating a corrected SFR according to the equation:

$$SFR = (A+B) - E$$

where
A = a correction factor to the SFR for ambient temperature, $T_2$;
B = a correction factor to the SFR for changes in fuel heating value, FHV, corrected for ambient temperature $T_2$ and turbine firing temperature $T_5$; and
E = a correction factor for relative humidity variations, RH.

18. A method as in claim 17 wherein the step of generating the correction factor A further includes the steps of:

multiplying the fifth electrical signal, $T_5$, by the constant 0.0011 and subtracting 0.5325 from the result to obtain $Y_1$;

multiplying the fourth electrical signal, $T_2$, by the constant 0.0003 to obtain $Y_2$; and subtracting $Y_2$ from $Y_1$ according to the equation:

$$A = Y_1 - Y_2 = (0.0011 T_5 - 0.5325) - 0.0003 T_2.$$

19. A method as in claim 18 wherein the step of generating the correction factor B further includes the steps of:

generating a first correction value by modifying the second electric signal, HV, with constants for a range of HV values according to the equations:

$Y_3 = -0.008333 HV + 7.084973$ for $800 < HV \leq 825$ BTU/SCF $Y_3 = -0.042000 HV + 34.860000$ for $825 < HV \leq 830$ BTU/SCF $Y_3 = +0.006561 HV - 5.445298$ for $830 < HV \leq 896$ BTU/SCF $Y_3 = +0.003451 HV - 2.659000$ for $896 < HV \leq 998$ BTU/SCF;

means for generating a second correction value by multiplying the fourth electrical signal, $T_2$, by a first constant and adding a second constant to the result according to the equations:

$Y_4 = 0.001795 T_2 + 0.894100$ for $T_2 < 59°$ and $Y_4 = 1$ for $T_2 \geq 59°$;

generating a third correction value by multiplying the fifth electrical signal, $T_5$, by a first constant and subtracting a second constant from the result according to the equation:

$Y_5 = 0.000741 T_5 - 0.092530$; and multiplying the first, second and third correction values together to obtain the correction factor, B, according to the equation:

$B = Y_3 \times Y_4 \times Y_5.$

20. A method as in claim 19 further including the step of adding correction factors C and D to obtain the correction factor E according to the equation:

$E = (C+D) \cdot RH/100$ where C equals $Y_6 \times Y_7$, $Y_6$ is a correction for SFR versus humidity variations (RH) as a function of ambient temperature $T_2$ and $Y_7$ is a function of turbine firing temperature $T_5$ and $D = Y_8 \times Y_9$ where $Y_8$ equals a correction for SFR versus fuel heating values as a function of humidity (RH) and $Y_9$ is a function of ambient temperature $T_2$.

21. A method as in claim 20 further comprising the steps of:

generating a correction factor, $Y_6$, by varying the fourth electrical signal, $T_2$, with constants for a range of $T_2$ values according to the equations:

$Y_6 = 0.000850 T_2 + 0.010000$ for $0°$ F. $< T_2 \leq 20°$ F.

$Y_6 = 0.002974 T_2 - 0.032486$ for $20°$ F. $< T_2 \leq 60°$ F.

$Y_6 = 0.007333 T_2 - 0.289665$ for $60°$ F. $< T_2 \leq 80°$ F.

$Y_6 = 0.013150 T_2 - 0.755000$ for $80°$ F. $< T_2 \leq 100°$ F.;

generating the correction factor, $Y_7$, by multiplying the fifth electrical signal, $T_5$, by a constant 0.00047 and adding the constant to 0.307 to the result according to the equation:

$Y_7 = 0.00047 T_2 + 0.307$; and multiplying the signals $Y_6$ and $Y_7$ to obtain $C = Y_6 \times Y_7.$

22. A method as in claim 21 further including the steps of:

generating the correction factor, $Y_8$, by varying the third electrical signal with constants for a range of HV values according to the equations:

$Y_8 = -0.003587 HV + 3.046600$ for $800 < HV \leq 825$ BTU/SCF $Y_8 = -0.017520 HV + 14.54160$ for $825 < HV \leq 830$ BTU/SCF $Y_8 = +0.002274 HV - 1.883800$ for $830 < HV \leq 896$ BTU/SCF $Y_8 = +0.001057 HV - 0.796849$ for $896 < HV \leq 998$ BTU/SCF;

generating the correction factor $Y_9$ by varying the fourth electrical signal $T_2$ with constants for a range of $T_2$ values according to the equations:

$Y_9 = 0.003220 T_2 + 0.050000$ for $T_2 \leq 67.4°$ F.

$Y_9 = 0.022500 T_2 - 1.250000$ for $67.4°$ F. $< T_2 \leq 100°$ F.; and multiplying $Y_8$ and $Y_9$ to obtain $D = Y_8 \times Y_9.$

23. A method as in claim 22 wherein the step of generating the correction factor E further comprises the steps of:

adding C+D;

dividing the second electrical signal, RH, by 100 to obtain a value representing relative humidity in percent; and multiplying the sum of C+D by the divided second electrical signal, RH/100 to obtain the correction factor E for relative humidity.

24. A method as in claim 23 further including the steps of:

adding A+B; and subtracting E from the quantity (A+B) to obtain $SFR = (A+B) - E.$ 25. A method as in claim 24 further comprising the step of multiplying (A+B)−E=SFR by the first electrical signal, $W_f$, to obtain the sixth electrical signal, $W_s$, according to the equation:

$$W_s = SFR \times W_f.$$

26. A method as in claim 25 further comprising the step of coupling the sixth electrical signal, $W_s$, to the steam valve for positioning the steam valve to allow sufficient steam to said combustor to satisfy the equation:

$$W_s = SFR \times W_f.$$

thereby minimizing $NO_x$ and CO emissions from said turbine.

* * * * *

UNITED STATES PATENT AND TRADEMARK OFFICE
CERTIFICATE OF CORRECTION

PATENT NO. : 5,357,741
DATED : October 25, 1994
INVENTOR(S) : Talabisco et al.

It is certified that error appears in the above-indentified patent and that said Letters Patent is hereby corrected as shown below:

Column 8, line 43, "$T_2.Y_9$" should read -- $T_2.$ $Y_9$ --.

Column 13, line 17, "$Y_8.$" should read -- $Y_8,$ --.

Signed and Sealed this

Twenty-first Day of March, 1995

Attest:

BRUCE LEHMAN

*Attesting Officer*     *Commissioner of Patents and Trademarks*